(12) United States Patent
Popescu et al.

(10) Patent No.: US 8,060,943 B1
(45) Date of Patent: Nov. 15, 2011

(54) CARBON NANOTUBE OSCILLATOR SURFACE PROFILING DEVICE AND METHOD OF USE

(75) Inventors: Adrian Popescu, Tampa, FL (US); Lilia M. Woods, Tampa, FL (US); Igor V. Bondarev, Fuquay Varina, NC (US)

(73) Assignees: University of South Florida, Tampa, FL (US); North Carolina Central University, Durham, NC (US)

( * ) Notice: Subject to any disclaimer, the term of this patent is extended or adjusted under 35 U.S.C. 154(b) by 304 days.

(21) Appl. No.: 12/548,070

(22) Filed: Aug. 26, 2009

Related U.S. Application Data

(60) Provisional application No. 61/091,834, filed on Aug. 26, 2008.

(51) Int. Cl.
*G01Q 70/00* (2010.01)
(52) U.S. Cl. .............. 850/52; 850/33; 73/105
(58) Field of Classification Search ............ 850/52
See application file for complete search history.

(56) References Cited

U.S. PATENT DOCUMENTS 6,666,075 B2 * 12/2003 Mancevski et al. ............. 73/105

OTHER PUBLICATIONS

Giessibl, Advances in Atomic Force Microscopy, Reviews of Modern Physics, 2003, vol. 75, pp. 949-983.
Chen, et al., Dependence of Workfunction on the Geometries of Single-Walled Carbon Nanotubes, Nanotechnology, 2004, vol. 15, pp. 480-484.
Kang, et al., Electrostatically Telescoping Nanotube Nonvolatile Memory Device, Nanotechnology, 2007, vol. 18, pp. 1-8.
Zheng, et al., Multiwalled Carbon Nanotubes as Gigahertz Oscillators, Physical Review Letters, 2002, vol. 88, No. 4, pp. 045503-1-045503-3.
Cumings, et al., Low-Friction Nanoscale Linear Bearing Realized from Multiwall Carbon Nanotubes, Science, 2000, vol. 289, pp. 602-604.
Ozer, et al., Measurement of Energy Dissipation Between Tungsten Tip and Si(1 0 0)-(2×1) Using Sub-Angstrom Oscillation Amplitude Non-Contact Atomic Force Microscope, Applied Surface Science, 2003, vol. 210, pp. 12-17.
Zhao, et al., Energy Dissipation Mechanisms in Carbon Nanotube Oscillators, Physical Review Letters, 2003, vol. 91, No. 17, pp. 175504-1-175504-4.
Rudolf, et al., Vibrational Dynamics of Fullerene Molecules Absorbed on Metal Surfaces Studied with Synchrotron Infrared Radiation, Applied Physics A, vol. 75, pp. 147-153.
Rivera, et al., Oscillatory Behavior of Double-Walled Nanotubes Under Extension: A Simple Nanoscale Damped Spring, Nano Letters, 2003, vol. 3, No. 8, pp. 1001-1005.
Kis, et al., Interlayer Forces and Ultralow Sliding Friction in Multiwalled Carbon Nanotubes, Physical Review Letters, 2006, vol. 97, pp. 025501-1-025501-4.

(Continued)

*Primary Examiner* — Phillip A Johnston
(74) *Attorney, Agent, or Firm* — Molly L. Sauter; Smith & Hopen, P.A.

(57) ABSTRACT

The proposed device is based on a carbon nanotube oscillator consisting of a finite length outer stationary nanotube and a finite length inner oscillating nanotube. Its main function is to measure changes in the characteristics of the motion of the carbon nanotube oscillating near a sample surface, and profile the roughness of this surface. The device operates in a non-contact mode, thus it can be virtually non-wear and non-fatigued system. It is an alternative to the existing atomic force microscope (AFM) tips used to scan surfaces to determine their roughness.

20 Claims, 8 Drawing Sheets

OTHER PUBLICATIONS

Guo, et al., Energy Dissipation in Gigahertz Oscillators from Multiwalled Carbon Nanotubes, Physical Review Letters, 2003, vol. 91, No. 12, pp. 125501-1-125501-4.

Trevethan, et al., Physical Dissipation Mechanisms in Non-Contact Atomic Force Microscopy, Nanotechnology, 2004, vol. 15, pp. S44-S48.

Volokitin, et al., Near-Field Radiative Heat Transfer and Noncontact Friction, Reviews of Modern Physics, 2007, vol. 79, pp. 1291-1329.

Tomassone, et al., Dominance of Phonon Friction for a Xenon Film on a Silver (111) Surface, Physical Review Letters, 1997, vol. 79, No. 24, pp. 4798-4801.

Persson, et al., Brownian Motion and Vibrational Phase Relaxation at Surfaces: CO on Ni(111), Physical Review B, 1985, vol. 32, No. 6, pp. 3586-3596.

Boutchko, et al., Dynamics of Monolayer Xenon Absorbed on Pt(111), Physical Review B, 2004, vol. 70, pp. 195422-1-195422-6.

Boutchko, et al., Brownian Friction of Gas Molecules on the Graphite Surface, Physical Review B, 1999, vol. 59, No. 16, pp. 10 992-10 995.

Gauthier et al., Theory of Energy Dissipation into Surface Vibrations, Noncontact Atomic Force Microscopy, 2002, Chapter 19, Berlin: Springer, pp. 371-394.

Saito et al., Structure of a Single-Wall Carbon Nanotube, Physical Properties of Carbon Nanotubes, 1998, Imperial College Press, Chapter 3, pp. 35-58.

Gradshteyn et al., Tables of Integrals, Series, and Products, 1965, Academic Press, New York, 6th Edition, pp. 948-949 and pp. 1040-1044.

* cited by examiner

CARBON NANOTUBE OSCILLATOR SURFACE PROFILING DEVICE AND METHOD OF USE

CROSS REFERENCE TO RELATED APPLICATIONS

This application claims priority to U.S. Provisional Patent Application No. 60/091,834 entitled "Carbon Nanotube Oscillator as a Surface Profiling Device", filed on Aug. 26, 2008.

STATEMENT OF GOVERNMENT INTEREST

This invention was made with government support under U.S. Department of Energy grant DE-FG02-06ER46297, and the government thus may have certain rights in this invention.

BACKGROUND OF THE INVENTION

Carbon nanotubes (CNT) are quasi-one dimensional structures which are obtained by rolling up graphene sheets into cylinders. There are single wall carbon nanotubes, consisting of one sheet, and multi-wall carbon nanotubes, consisting of two or more concentric cylindrical sheets. The particular way of graphene rolling is characterized by a chirality index (n,m), which determines if the rolled graphene is metallic or semi-conducting. In addition, CNT can have diameters in the range of 0.5-1.5 nm and lengths up to several micrometers.

CNTs have received much attention due to their potential applications as integrated nanoscale elements in various devices. Low-friction, low-wear multi-wall CNT bearings have been demonstrated. Prior work in the art has shown that if an inner tube from a double wall nanotube is extruded with respect to the stationary outer tube, the inner tube can easily slide or rotate due to the intertube van der Waals (vdW) interaction. Such devices have been reported to have very low friction—at least two orders of magnitude smaller than the vdW forces.

Scanning probe microscopes, such as the Atomic Force Microscope (AFM), are examples of scanning probe imaging and sensing devices. These devices are useful for surface profiling. A non-contact AFM measures the microscopic surface profile of a near-planar target using a nanometer-scale probe that is mounted at the end of a tiny cantilever. Deflection of the cantilever, as the probe is raster-scanned across the surface of the target, is optically measured. The measurements are used to establish a profile of the target surface. However, the resolution of the AFM is limited by the probe tip radius, which is on the order of a few tens of nanometers.

Accordingly, what is needed in the art is a non-contact surface profiling device that provides an improved resolution over the AFM systems currently known in the art.

SUMMARY OF INVENTION

In accordance with the present invention, a CNT oscillator is proposed to be used as a surface profiling device. The CNT oscillator will provide an improved resolution over an atomic force microscope (AFM) tip operating in non-contact mode. The carbon nanotube oscillator in accordance with the present invention can achieve in-plane resolution ~1 nm as compared to 20-30 nm in-plane resolution for typical atomic force microscope (AFM) tips known in the art.

This invention proposes to use a finite length double wall carbon nanotube (CNT) oscillator consisting of an outer stationary and an inner oscillating tube as a surface profiling device. The idea of the device is supported by two facts. First, the frequency of oscillations of the inner tube depends strongly on the distance between the CNT and the surface. Second, the frequency of oscillations is determined by a small region located around the diameter of the oscillating tube. The operation of the device is the following. The CNT is brought in the vicinity of a surface with an unknown roughness. The axis of the CNT is perpendicular to the plane of the surface. The frequency of oscillations is recorded. The surface is moved at a distance corresponding to the small region determining the frequency. This is done in such a way as to keep the nanotube axis perpendicular to the surface plane. The frequency of oscillations is recorded again. This process is repeated as many times as an operator requires. This process allows for profiling the roughness of the surface since the frequency of oscillations depends strongly on the distance between the CNT and the surface.

In a particular embodiment, the present invention provides a method for profiling a sample surface, which includes positioning an open-ended double wall carbon nanotube oscillator in close proximity to a sample surface such that the axis of the carbon nanotube oscillator is substantially perpendicular to a sample surface, the carbon nanotube oscillator comprising a stationary carbon nanotube having a first length and a first interior diameter and an oscillatory carbon nanotube positioned within the interior of the stationary carbon nanotube, the oscillatory carbon nanotube having a second length and a second interior diameter that is smaller than the first interior diameter. The oscillation of the oscillatory carbon nanotube is then initiated and the frequency of oscillation of the oscillatory carbon nanotube is measured. The method further includes, re-positioning the carbon nanotube oscillator at a plurality of locations perpendicular to the sample surface, re-initiating the oscillation of the oscillatory carbon nanotube and re-measuring the frequency of oscillation at each of the plurality of locations to profile the sample surface.

The oscillation of the oscillatory carbon nanotube can be initiated by extruding the oscillatory carbon nanotube from the stationary carbon nanotube, along the common axis of the stationary and oscillator carbon nanotubes, to a first distance from a first edge of the stationary carbon nanotube and then releasing the oscillatory carbon nanotube to initiate the oscillation.

In a particular embodiment, measuring the frequency of the oscillation of the oscillatory carbon nanotube includes positioning a laser at a first edge, distal from the sample surface, of the stationary carbon nanotube, the laser to emit a laser beam and positioning a laser detector at a first edge, distal from the sample surface, of the stationary carbon nanotube and in-line with the laser, the detector to measure the intensity of the laser beam emitted by the laser as the oscillatory tube oscillates.

In accordance with an embodiment of the present invention, a system for profiling a sample surface is provided. The system includes an open-ended double wall carbon nanotube oscillator comprising a stationary carbon nanotube having a first length and a first interior diameter and an oscillatory carbon nanotube positioned within the interior of the stationary carbon nanotube, the oscillatory carbon nanotube having a second length and a second interior diameter that is smaller than the first interior diameter and a laser-detector positioned at a first edge, distal from a sample surface, of the stationary carbon nanotube, the laser-detector for measuring the frequency of oscillation of the oscillatory carbon nanotube.

In a particular embodiment, the system utilizes an electrostatic telescoping device to extrude the oscillatory carbon nanotube from the stationary carbon nanotube by an initial extrusion distance to initiate the oscillation of the oscillatory carbon nanotube.

In a specific embodiment, the laser-detector includes a laser to emit a laser beam and a laser detector positioned in-line with the laser, the detector to measure the intensity of the laser beam emitted by the laser as the oscillatory tube oscillates.

The proposed device is based on a carbon nanotube oscillator consisting of a finite length outer stationary nanotube and a finite length inner oscillating nanotube. Its main function is to measure changes in the characteristics of the motion of the carbon nanotube oscillating near a sample surface, and profile the roughness of this surface. The device operates in a non-contact mode, thus it can be virtually non-wear and non-fatigued system. The carbon nanotube oscillator in accordance with the present invention can achieve in-plane resolution ~1 nm as compared to 20-30 nm in-plane resolution for typical atomic force microscope (AFM) tips known in the art. Finally, the double wall carbon nanotube oscillator can be achieved even if the tubes have mechanical imperfections in their structure, which makes it economically desirable.

BRIEF DESCRIPTION OF THE DRAWINGS

For a fuller understanding of the invention, reference should be made to the following detailed description, taken in connection with the accompanying drawings, in which:

FIG. 3 is a combination of 3(a), 3(b) and 3(c).

DETAILED DESCRIPTION OF THE PREFERRED EMBODIMENT

Figure 1:
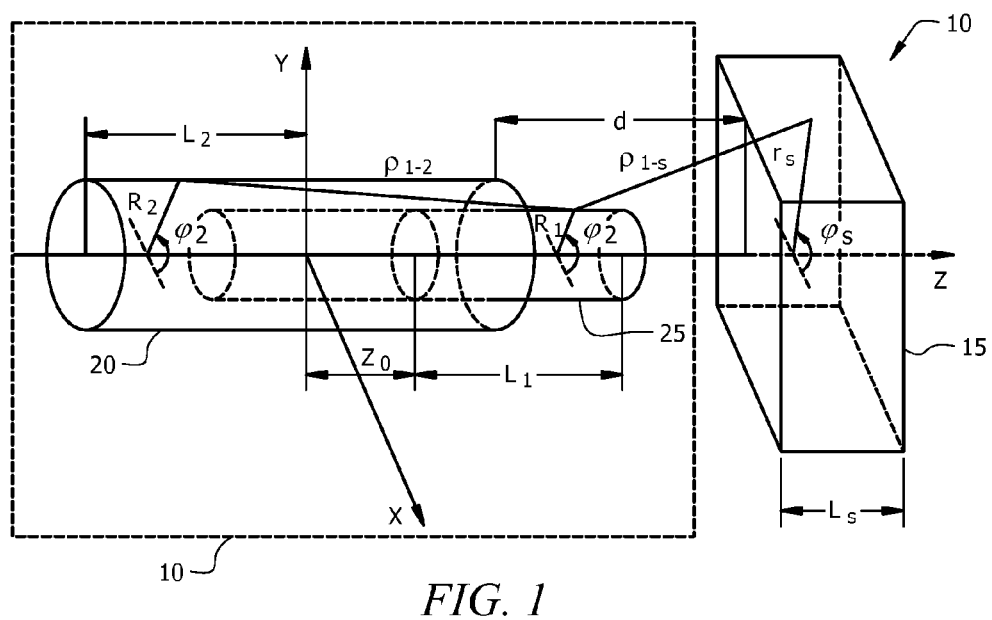
FIG. 1 is a schematic drawing of a double wall CNT oscillator and sample surface in accordance with the present invention.

FIG. 1 is a schematic drawing of a double wall CNT oscillator 10 near a sample surface 15. The inner tube 25 and outer tube 20 have radii $R_1$ and $R_2$, and lengths $2L_1$ and $2L_2$ and have the common z-axis perpendicular to the sample 15 of thickness $L_s$. The distance between the outer fixed tube 20 and the sample 15 is d. The displacement of the inner tube 25 is denoted as $z_0$. Two typical points located on the two tubes have the coordinates $(R_1, \phi_1, z_1)$, $(R_2, \phi_2, z_2)$ and their relative distance is $\rho_{1-2}$. A point within the sample is described with $(r_s, \phi_s, z_s)$ and its relative distance to a point on the moving inner tube is $\rho_{1-s}$.

Consider an open ended double wall CNT consisting of inner and outer tubes with radii $R_1$ and $R_2$, and with lengths $2L_1$ and $2L_2$, respectively. Let the carbon bonds at the ends be saturated to prevent chemical reaction with the environment. Let the outer tube be stationary and the inner one be extruded from the outer one along their common axis at some initial distance. This can be done, for example, by electrostatically telescoping the inner tube using procedures currently known in the art. The inner tube is released and due to the mutual van der Waals (vdW) force between the ends of the inner and outer tube, the tube can oscillate in time. This case is referred to as "free oscillation".

The proposed invention involves a double wall CNT oscillator brought within a close proximity to an infinite sample with thickness $L_s$. The general configuration is such that the axis of the tube is perpendicular to the sample surface as shown in FIG. 1. The inner tube is extruded from the outer one at some initial position (−s) and then released from rest. The motion of the inner tube is oscillatory again, but it has different characteristics as compared to the free oscillation case. The operation of the device is determined by the forces governing the motion. In this case, they are the vdW force in the double wall CNT and the vdW between the CNT and the sample. In addition, there is a friction force between the surface and the moving tube due to tube-surface dissipation processes. The motion of the inner tube is oscillatory again, but it has different characteristics as compared to the free oscillation case. For the free oscillation, the inner tube will oscillate between −s and s. When the sample is present, the oscillation will be between −s and $z_{0,f} \neq s$, where $z_{0,f}$ is determined by the repulsive part of the vdW interaction between the tube and the sample and the dissipation force. This in turn will cause changes in the oscillation motion as compared to the free oscillation motion.

To examine the motion of the inner tube from FIG. 1, the vdW interactions in the system are describes. For this purpose, the pairwise additive Lennard-Jones (LJ) type of vdW potential for extended systems is adopted. The LJ approach has been widely used in calculating the vdW interaction in carbon structures because of its relative simplicity and satisfactory results when compared with experimental data. It is found that the LJ-vdW potential is suitable for parallel single walled CNT, multiwall CNTs, fullerenes inside single walled CNTs, and radially deformed single and multiwall CNTs. Also, the LJ model has been applied in calculating the oscillatory frequency and describing the characteristic behavior of various CNT oscillator systems.

The total LJ-vdW potential, and consequently the vdW force, in the system consists of adding the contributions from the interaction between the inner and outer tubes, between the inner tube and the sample, and between the outer tube and the sample. The motion of the inner tube is affected only by the first two contributions, thus the interaction between the outer tube and the sample is not considered here.

The general form of the LJ vdW interaction is given as:

$$V = \sigma_1 \sigma_2 \int\int \left(-\frac{A}{\rho^6} + \frac{B}{\rho^{12}}\right) dV_1 dV_2 \tag{1}$$

where $\sigma_1$ and $\sigma_2$ represent the atomic volume densities of the two interacting objects, and $dV_1$ and $dV_2$ are the corresponding volume elements, separated by a distance $\rho$. The constants A and B are the Hamaker constants, which depend on the materials of the two interacting bodies. The total vdW interaction for the moving inner tube from FIG. 1 is:

$$V = V_{1-2} + V_{1-s}, \tag{2}$$

where $V_{1-2}$ is the tube-tube interaction and $V_{1-s}$ is the inner tube-sample interaction. For the tube-tube interaction the integration is over the surfaces of the nanotubes according to:

$$V_{1-2} = \sigma_1 \sigma_2 \int_0^{2\pi} d\varphi_1 \int_0^{2\pi} d\varphi_2 \int_{-L_1}^{L_1} dz_1 \int_{-L_2}^{L_2} dz_2 R_1 R_2 \left(-\frac{A}{\rho_{1-2}^6} + \frac{B}{\rho_{1-2}^{12}}\right) \quad (3)$$

The surface density of atoms for the two tubes is $$\sigma_1 = \sigma_2 = \sigma_0 = \frac{4}{\sqrt{3}\, a^2},$$

where a=2.49 Å is the graphene lattice constant, and the coefficients A=15.2 eV·Å and B=24×10³ eV·Å are taken to be the same as the ones for a graphene-graphene system. $\rho_{1-2}$ is the distance between two points located on the two tubes as shown in FIG. 1:

$$\rho_{1-2} = (x_{out} - x_{in})^2 + (y_{out} - y_{in})^2 + (z_{out} - z_{in})^2 \quad (4)$$

The corresponding coordinates for the inner (denoted as in) and outer (denoted as out) tubes are:

$$x_{in} = R_1 \cos\varphi_1 \quad x_{out} = R_2 \cos\varphi_2 \quad (5)$$
$$y_{in} = R_1 \sin\varphi_1 \quad y_{out} = R_2 \sin\varphi_2$$

$$z_{in} = z_1 + z_0 \quad z_{out} = z_2$$

$\phi_1$ and $\phi_2$ are the azimuthal angles for each tube (shown in FIG. 1). Equation (3) can be further simplified by performing the integrals over the angular variables giving the result:

$$V_{1-2} = 4\pi^2 \sigma_0^2 R_1 \quad (6)$$
$$R_2 \int_{-L_1}^{L_1} dz_1 \int_{-L_2}^{L_2} dz_2 \left(-\frac{A}{\eta_1^3} F\left(3, \frac{1}{2}, 1; -\frac{\eta_2}{\eta_1}\right) + \frac{B}{\eta_1^6} F\left(6, \frac{1}{2}, 1; -\frac{\eta_2}{\eta_1}\right)\right),$$

where F(a,b,c;d) represents the hypergeometric function, and by $\eta_1$ and $\eta_2$ is denoted:

$$\eta_1 = (R_2 - R_1)^2 + (z_0 + z_1 - z_2)^2 \quad \eta_2 = R_1 R_2 \quad (7)$$

The interaction between the inner mobile tube and the sample can be written as:

$$V_{1-s} = \quad (8)$$
$$n_2 \sigma_0 \int_0^{2\pi} d\varphi_1 \int_0^{2\pi} d\varphi_s \int_{-L_1}^{L_1} dz_1 \int_0^{L_s} dz_s \int_0^{\infty} dr_s r_s R_1 \left(-\frac{A}{\rho_{1-s}^6} + \frac{B}{\rho_{1-s}^{12}}\right)$$

where $n_s$ represents the atomic volume density of the sample. The integration is done over the surface of the CNT and the volume of the sample. In Eq. (8) $\rho_{1-s}$ is the distance between two points located on the two objects according to FIG. 1:

$$\rho_{1-s} = (x_s - x_{in})^2 + (y_s - y_{in})^2 + (z_s - z_{in})^2 \quad (9)$$

The corresponding coordinates for the inner tube are given by Eq. (5) and for the sample are:

$$x_s = r_s \cos\phi_s, \, y_s = r_s \sin\phi_s, \, z_s = L_1 + d + z_s \quad (10)$$

After integrating over the angular variables, Eq. (8) is reduced to:

$$V_{1-s} = 4\pi^2 n_s \sigma_0 \int_0^{L_s} dz_s \int_{-L_2}^{L_2} dz_1 \quad (11)$$
$$\int_0^{\infty} dr_s r_s R_1 \left(-\frac{A}{\xi_1^3} F\left(3, \frac{1}{2}, 1; -\frac{\xi_2}{\xi_1}\right) + \frac{B}{\xi_1^6} F\left(6, \frac{1}{2}, 1; -\frac{\xi_2}{\xi_1}\right)\right)$$

where F(a,b,c;d) is the hypergeometric function and $\xi_1$ and $\xi_2$ are defined as $$\xi_1 = (r_s - R_1)^2 + (L_1 + d + z_s - z_1 - z_0)^2 \quad \xi_2 = r_s R_1 \quad (12)$$

In this model it is assumed that the forces responsible for the energy dissipation processes between the tubes are negligible compared to the vdW force. This assumption is supported by the fact that the friction between the nanotubes is at least two orders of magnitude less than the vdW interaction. In addition, the structure parameters, such as the chiral combination of the tubes, their radii and lengths, and the initial extrusion of the mobile tube, can be chosen in such a way as to further minimize the inter-tube energy dissipation and to make the oscillatory motion dynamically stable. Also, experimental measurements have shown that even defective oscillating tubes maintain their ultralow friction.

The presence of the sample is another source of energy loss in the oscillatory motion. In fact, the oscillating tube near an infinite surface is an example of a system with non-contact friction. The origin of such friction has been related to vdW interactions, to the creation of collective excitations, such as phonons, or to the spatial variation of the surface potential when an external voltage bias is applied. As a result, there is damping associated with a friction force $-F_{fr} = m\gamma v$, where m is the mass of the object, v is the velocity and $\gamma$ is the friction coefficient. Much effort has been devoted in calculating $\gamma$ due to the various forces. Using the results for $\gamma$ summarized in the most recent review, it is found that the dominant contribution to the friction is determined when the oscillating tube is in the close vicinity of the equilibrium position of the tube with respect to the surface. In this case, the tube creates stress which excites acoustic waves on the sample. Calculations of the friction parameter due to this phenomenon were done in studies related to non-contact atomic force microscopy, molecule adsorbates on surfaces, and Brownian motion of molecules on surfaces. The vdW interaction itself between the tube and the surface can also give rise to friction. However, for a cylindrical object $\gamma \sim 1/d^7$, it is estimated that in this case $F_{fr}$ is even smaller than the intertube friction.

Therefore, in the present invention, the friction force in the system is mainly due to the excitations of acoustic waves in the sample, when the oscillating tube comes close to the surface, and it is described by the following phenomenological expression:

$$F_{fr} = -m\gamma \dot{z}_0 \Theta(z_0 - z_c) \quad (13)$$

where m is the mass of the moving tube and $\gamma$ is the appropriate friction coefficient. $\Theta(z)$ is the Heaviside step function with $z_0(t)$ being the displacement of the inner tube along the z-axis. The friction is effective only within the region described by a cut-off distance $z_c \approx 5$ Å from the vdW barrier from the sample.

Then the motion of the inner tube as a function time is described by the second Newton's law as:

$$m\ddot{z}_0 + m\gamma \dot{z}_0 \Theta(z_0 - z_c) = F_{vdW} \quad (14)$$

where $\dot{z}_0 = dz_0(t)/dt$, $\ddot{z}_0 = d^2 z_0(t)/dt^2$.

The results from the calculations for the nanotube oscillator system from FIG. 1 are involve obtaining the potential from Eq. (2) governing the motion of the inner tube, the vdW force corresponding to this potential, and solving the equation of motion from Eq. (14). In all numerical calculations shown here, the sample is taken to be semi-infinite $L_s \to \infty$. Also, its volume atomic density $n_s$ is taken to have the same numerical value as the surface atomic density $\sigma_0$ for the CNT. Choosing a finite width of the sample or another value for the atomic density does not change qualitatively the oscillatory behavior of the system described below.

In a particular embodiment, a double wall (5,0)@(7,9) carbon nanotube with corresponding radii $R_1$=1.95 Å and $R_2$=5.44 Å and the common z-axis perpendicular to the sample surface, as shown in FIG. 1, is used. The tubes are chosen to have the same lengths $2L_1$=$2L_2$=70 Å. The oscillation is initiated by pulling out the inner tube to an initial extrusion position $-s$ from the stationary outer tube and releasing it from rest.

In this exemplary embodiment, this particular double wall CNT was chosen due to the following reasons. First, recent MD simulation studies have shown that the energy dissipation in incommensurate systems is lower than the energy dissipation in commensurate ones. This is an incommensurate system. Second, the difference in the (5,0)@(7,9) radii is ~3.5 Å which is very similar to the required 3.4 Å radial difference for a dynamically stable motion according. In order to avoid the off-axial rocking motion and thus further reduce the energy dissipation in the system, the extrusion length must not exceed 30% of the total tube length. Here, the initial extrusion length is taken to be $|s|$=7.5 Å, which is approximately 11% of the total tube length. The excess energy of the moving tube corresponding to the extrusion of 7.5 Å is $|E_0|$=10.5 meV/atom.

Figure 2A:
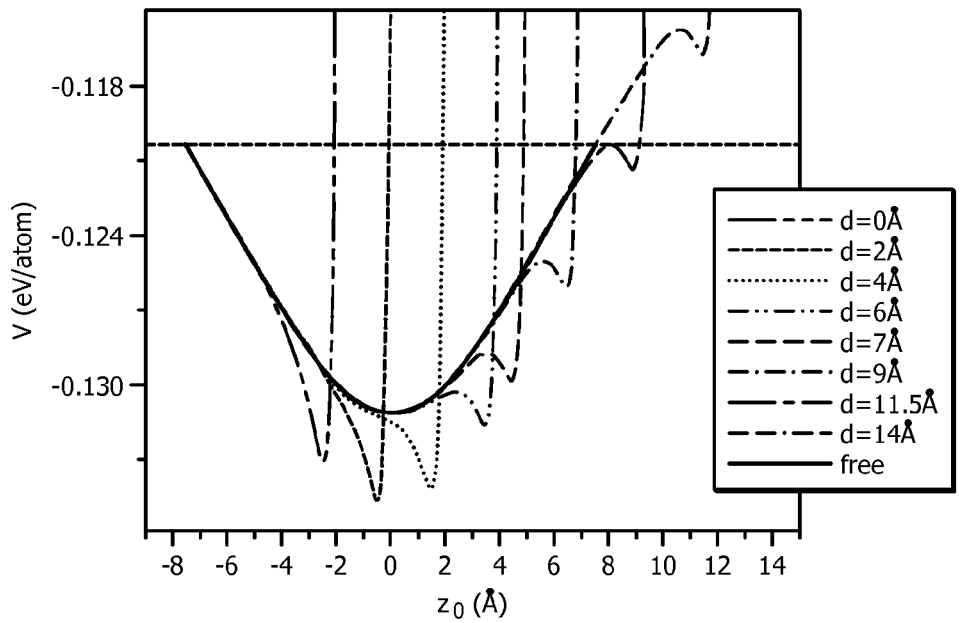
FIG. 2 is a graphical illustration of the (a) vdW potential and (b) vdW force of the moving tube as a function of its displacement.
Figure 2B:
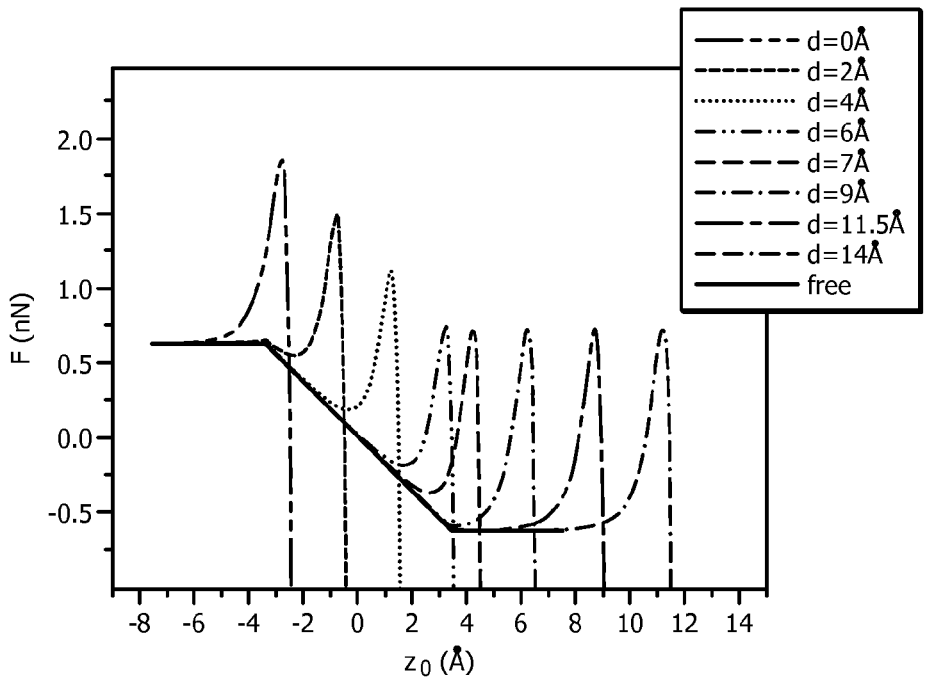

The vdW potential of the inner tube is calculated according to Eqs. (2, 6, 11) and it is shown in FIG. 2 (a) for several locations of the semi-infinite sample with respect to the edge of the fixed outer tube. The potential for the free oscillation is also shown indicating that the motion of the tube is between $-7.5$ Å and 7.5 Å in this case. FIG. 2 (a) shows that when the sample is at d>11.5 Å, the potential of the oscillating tube in the region $z_0 \in [-7.5, 7.5]$Å is the same as the one for the free oscillation. For d<11.5 Å, the influence of the sample becomes apparent and the characteristic shape of the vdW potential with an attractive and a repulsive regions is obtained within $z_0 \in [-7.5, 7.5]$Å. It is found that the minimum of $V_{1-s}$ always occurs when the distance between the edge of moving tube and the sample is ~2.5 Å. Thus bringing the sample closer causes the position of the $V_{1-s}$ potential minimum to appear closer to the edge of the stationary tube and its repulsive tail has stronger effect on the motion of the inner tube. The curve for d=0 Å corresponds to the limiting case of the outer tube being in contact with the sample surface.

The corresponding vdW force acting on the moving tube is calculated using $F_{vdW}=-dV/dz_0$. The results are shown in FIG. 2 (b). One sees that for the free oscillation, the force has a constant value region (F=0.62 nN) followed by a linear region and again by a constant value region (F=-0.62 nN). When the sample is at d<11.5 Å, $F_{vdW}$ has an additional non-linear contribution corresponding to the attractive and repulsive parts of the vdW potential from the sample.

The main contribution to the value of the numerical integration of the vdW potential due to the sample surface (Eq. (11)) is also examined. It is found that for all d, it is determined primarily by a rather localized circular region from the sample with radius $r_s \leq 5R_1 \sim 1$ nm. The rest of the surface sample contributes less than 1% to the numerical integration of Eq. (11). Thus the vdW interaction and consequently, the oscillatory behavior of the nanotube oscillator are determined mainly by a relatively limited circular region of the sample.

The vdW potential and force for other double wall nanotube oscillating systems have been calculated. These include nanotubes with different chiralities, lengths, and extrusions. In all cases the main contribution to the tube-surface interaction comes from a localized region from the sample with $r_s \leq 5R_1$. Also, the vdW potential and force have similar shapes as the ones shown in FIG. 2. However, the absolute value of the minimum of V (maximum of F) decreases for longer tubes, and the linear regions for V and F extend over larger distances for larger extrusions.

The CNT motion in terms of its displacement and velocity as a function of time is obtained by solving Eq. (14) numerically, which involves the coefficient $\gamma$ describing the friction due to the acoustic wave excitations in the sample. To estimate $\gamma$, the analytical expression for the coefficient of friction of an oscillating molecule near a surface is used, $$\gamma = \frac{m\omega_0 \xi_\perp}{8\pi\rho}\left(\frac{\omega_0}{c_T}\right)^3,$$

where m is the mass of the molecule oscillating perpendicular to the sample surface, $\omega_0$ is the oscillation frequency, $\rho$ is the mass density of the sample, $c_T$ is the transverse sound velocity in the sample, and $\xi_\perp$=3.29. This expression takes into account the vibrational energy relaxation of the molecule motion due to acoustic wave excitations in the sample. In this case, m is the mass of the oscillating tube which is estimated as a sum of the masses of the C atoms comprising the tube, and $\omega_0$ is taken to be the frequency of 'free' oscillations of that tube. It is found that $\gamma \sim 10^9, 10^{10}$ s$^{-1}$ for several metallic systems (using $\rho$ and $c_T$ for Al, Cu, Au, and Fe), and $\gamma \sim 10^8, 10^9$ s$^{-1}$ for several semiconducting systems (using $\rho$ and $c_T$ for Si, GaAs, and GaN).

Figure 3:
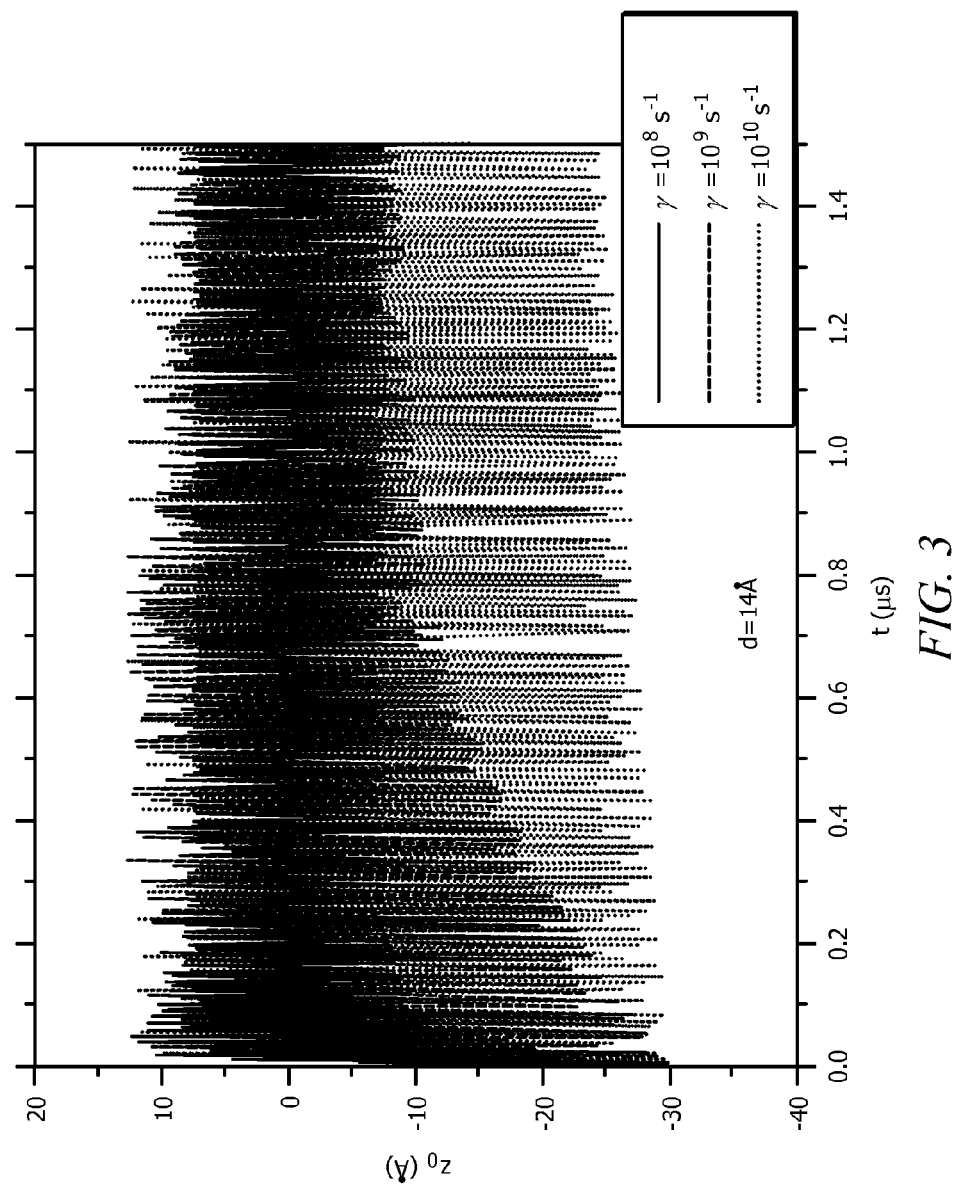
FIGS. 3, 3(a), 3(b) and 3(c) are graphical illustrations of the displacement of the moving tube along the z-axis as a function of time for different values of the friction coefficient γ.
Figure 3A:
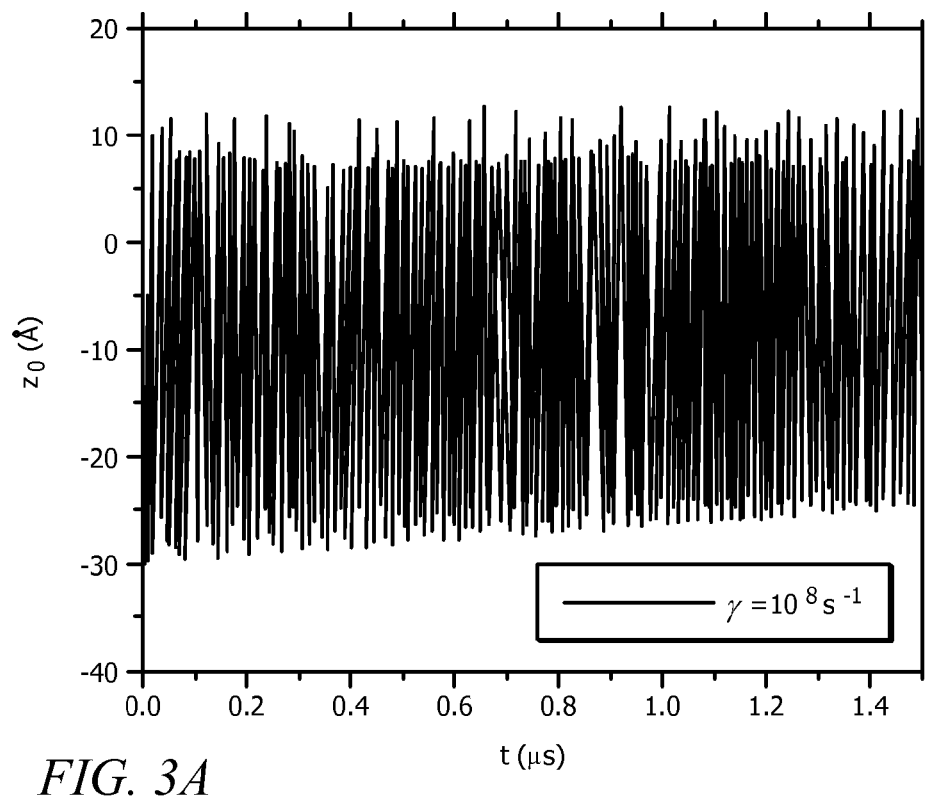
Figure 3B:
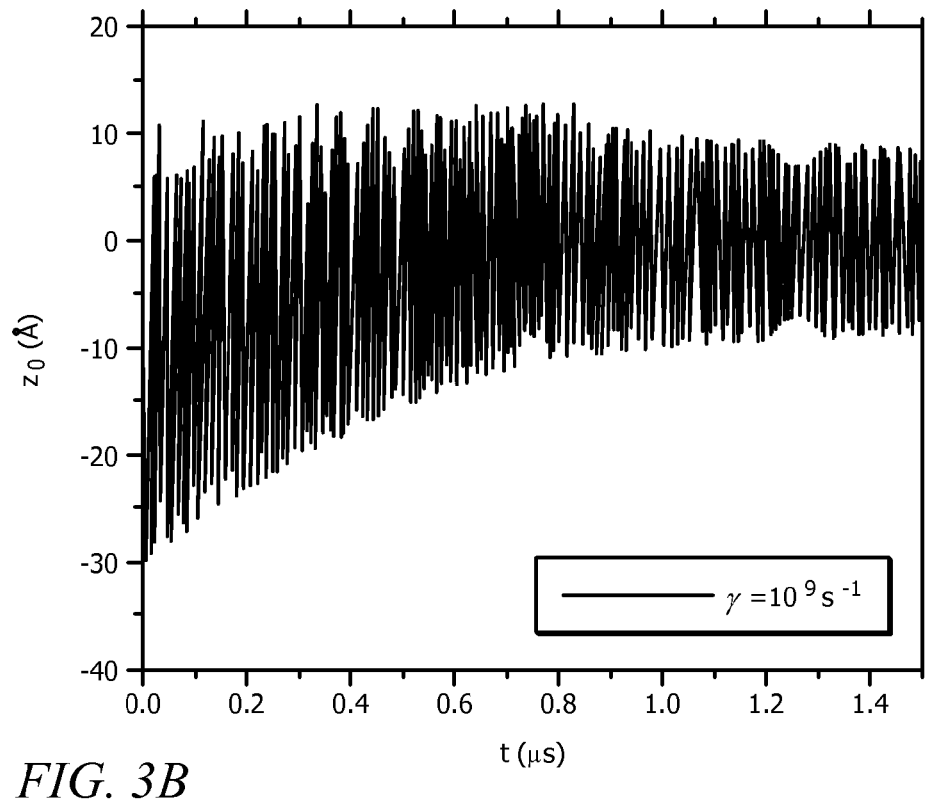
Figure 3C:
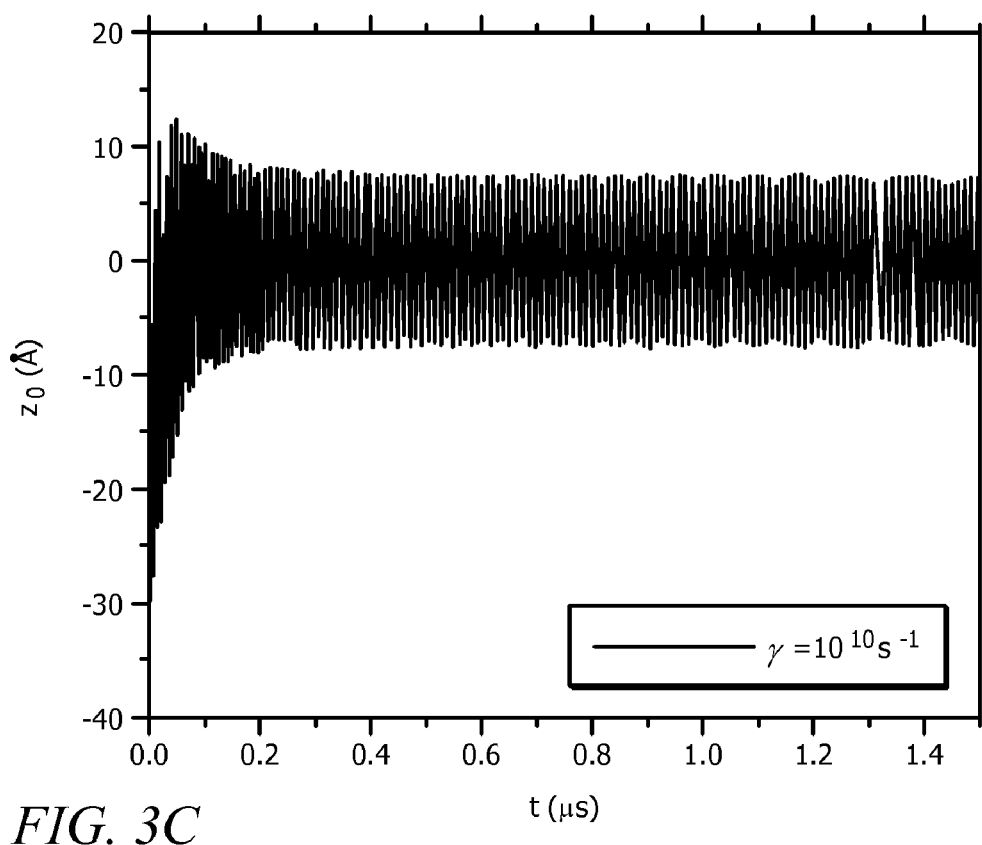

A particular embodiment utilizes (5,0)@(7,9) double wall nanotube with lengths $2L_1$=$2L_2$=150 Å where the initial extrusion is $|s|$=30 Å, which corresponds to 20% of the initial tube length. The excess vdW energy is $|E_0|$=18 eV. In this case, the vdW force due to the infinite surface sample affects the motion of the inner tube if $0 \leq d \leq 35$ Å. FIG. 3 illustrates the displacement of the moving tube along the z-axis as a function of time for different values of the friction coefficient $\gamma$. The distance between the sample and the edge of the outer tube is taken to be d=15 Å. FIG. 3 illustrates how $z_0$ changes in time for three values of the friction parameter when the outer tube is at d=15 Å from the surface.

FIG. 3 shows that the CNT motion has two characteristic regions: damped oscillatory region and 'friction-free' oscillatory region. The damping occurs over a certain time interval $\Delta t_\gamma$, and it is found that $\Delta t_\gamma \sim 0.3$ μs for $\gamma = 10^{10}$ s$^{-1}$, $\Delta t_\gamma \sim 1$ μs for $\gamma = 10^9$ s$^{-1}$, and $\Delta t_\gamma \sim 20$ μs for $\gamma = 10^8$ s$^{-1}$. This is explained by realizing that every time the inner tube comes close to the surface, it looses some energy and it does not reach the same distance from the surface the next time. However, since the friction is effective only when the tube is in the vicinity of the surface (determined by $z_c$), the energy loss process continues until the tube is far enough from the sample surface. After that the friction process is not effective anymore and the tube oscillates freely but with less energy (determined by $\gamma$) than the initial energy. For larger $\gamma$ more energy is lost at each step, therefore $\Delta t_\gamma$ is shorter.

Figure 4A:
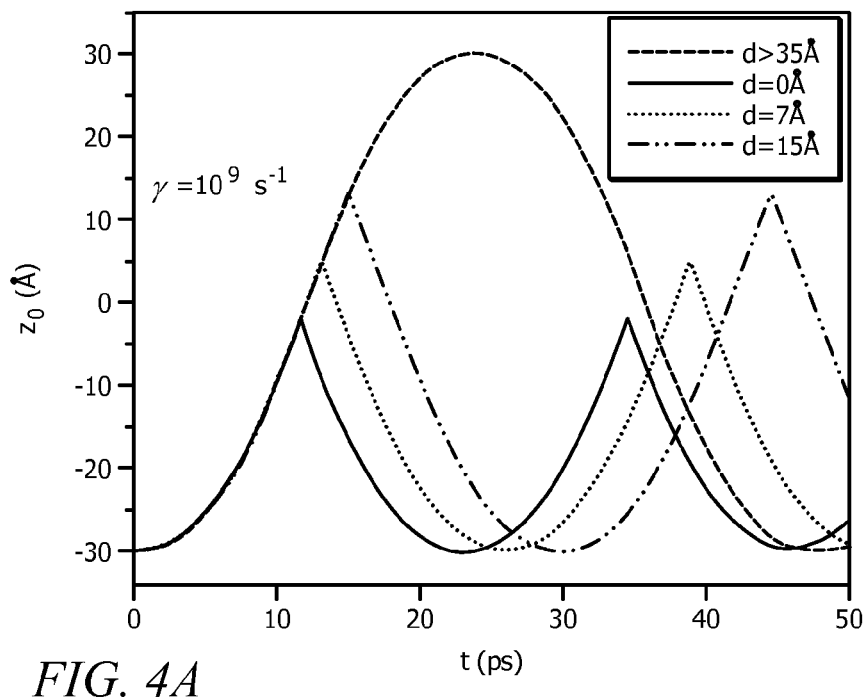
FIG. 4 is a graphical illustration of (a) displacement and (b) velocity of the oscillating inner tube as a function of time for different locations of the sample.
Figure 4B:
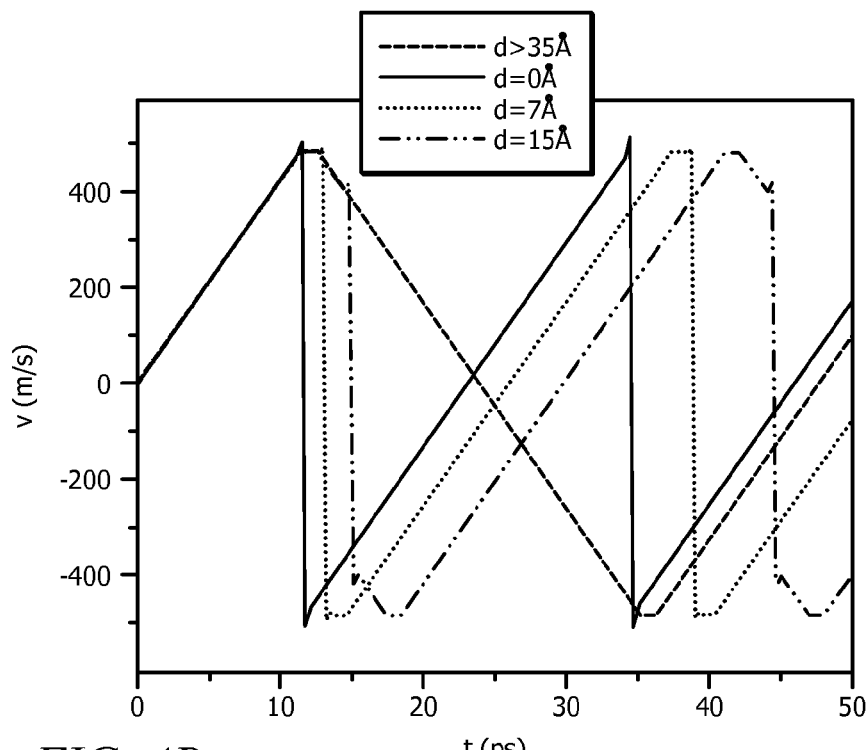

The time dependence of $z_0$ and the corresponding velocity v for the first few periods has been studied in order to determine how the sample surface affects the motion of the tube at smaller time scale. FIG. 4 illustrates the (a) displacement and (b) velocity of the oscillating inner tube as a function of time for different locations of the semi-infinite sample with respect to the edge of the outer tube for $\gamma=10^9$ s$^{-1}$.

The friction coefficient is chosen to be $\gamma=10^9$ s$^{-1}$ for FIGS. 4 (a) and (b). For d>35 Å the surface is too far from the tube and the motion is determined mainly by $F_{1-2}$. The velocity has linearly increasing and decreasing portions corresponding to the appropriate segments of the vdW force between the tubes, as shown in FIG. 4 (b). As the surface is brought closer, the duration of each period of $z_0$ is shortened with the shortest time for one cycle corresponding to d=0 Å. The attractive part of $F_{1-s}$ causes the tube to accelerate and non-linear features of v are found when the tube is near the minimum of $F_{1-s}$. There the tube is accelerated for a short time, and then it is quickly repelled by the repulsive part at a distance ~2 Å from the sample surface. The velocity of the tube reverses its direction and the oscillating tube starts accelerating in the opposite direction. The motion process is repeated in reversed order.

Figure 5A:
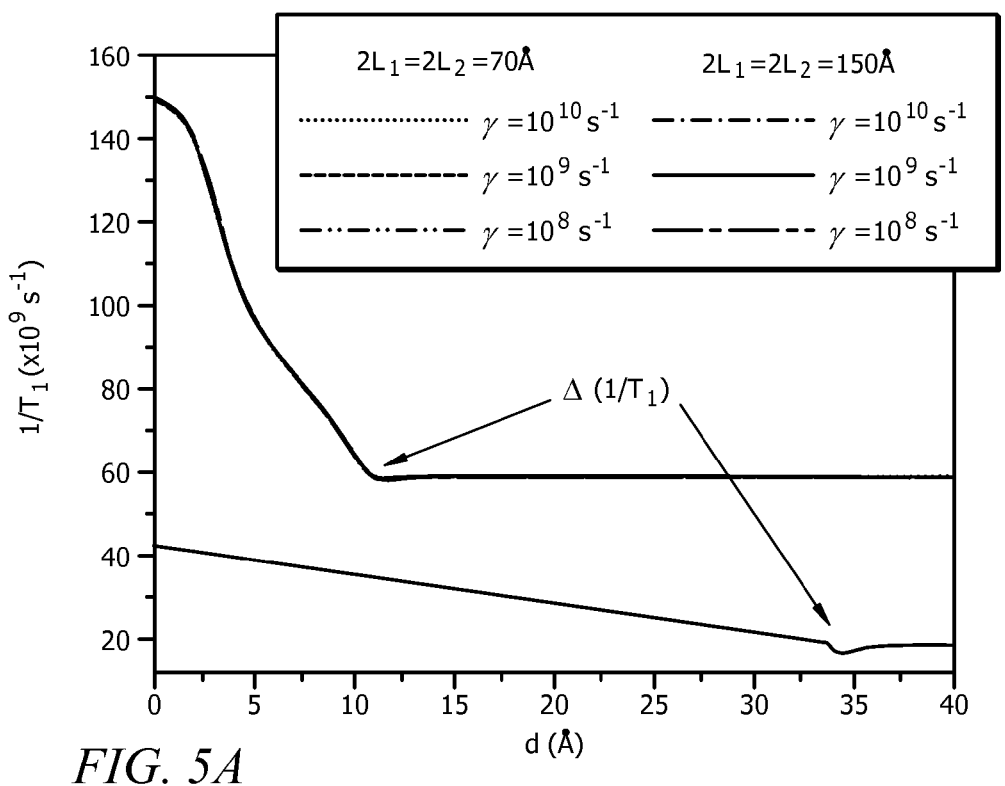
FIG. 5 is a graphical illustration of (a) inverse of the time $T_1$ for the tube to undergo the first complete cycle and (b) inverse of the period $T_f$ of oscillations.
Figure 5B:
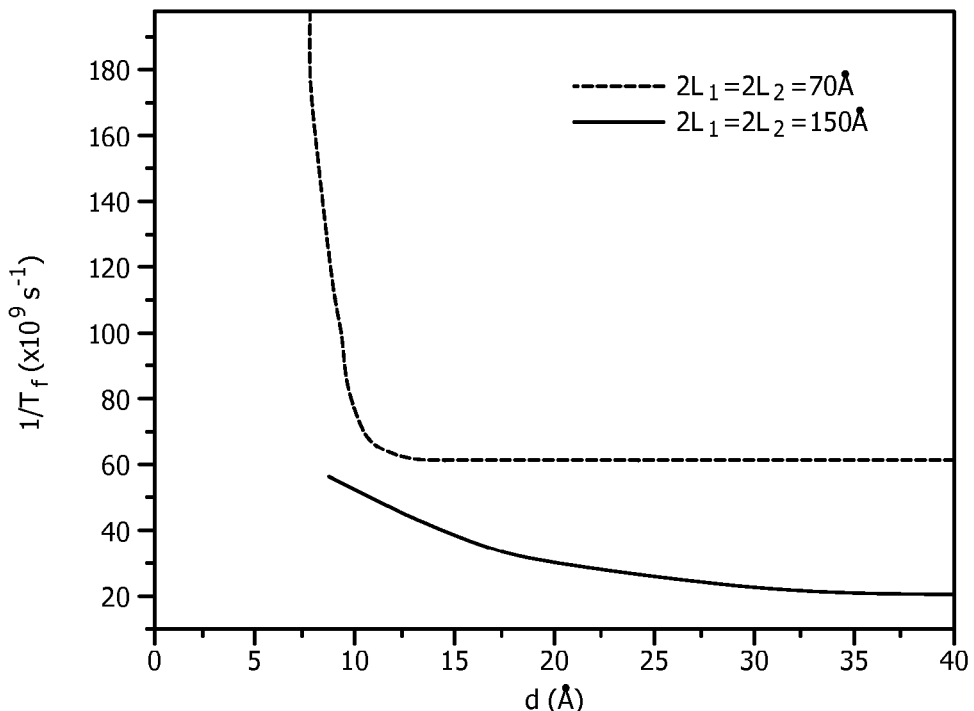

The results obtained so far allow investigation of some characteristic times as a function of different parameters of the system. Focusing on the time of the first period of the oscillations $T_1$, and the time of each period $T_f$ after the inner tube has reached the regime of friction-free oscillations (after time $\Delta t_r$) following the initial loss of energy due to the friction. In FIGS. 5 (a) and (b), the results for 1/$T_1$ and 1/$T_f$ are shown for tubes with two lengths for different values of the friction coefficient. The initial extrusion for the shorter tubes is 7.5 Å, while for the longer ones is 30 Å.

It is interesting to see that the proximity of the surface has a rather profound effect on both 1/$T_1$ and 1/$T_f$. FIG. 5 illustrates, (a) the inverse of the time $T_1$ for the tube to undergo the first complete cycle starting from rest for different $\gamma$; and (b) inverse of the period $T_f$ of oscillations after the tube has reached the friction-free regime, as a function of the distance d.

FIGS. 5 (a) and (b) shows that there is a trend of increasing of 1/$T_1$ and 1/$T_f$ as the sample surface is brought closer to the tube. The changes are more dramatic for the shorter tubes but they are over a shorter distance d range since the inner tube can be extruded at smaller s as compared to the longer one. In both cases there is a free oscillation regime, also determined by the restrictions imposed by the initial extrusion. For L=70 Å when d>12 Å, the tube behaves as a free double wall oscillator, while for L=150 Å the free oscillatory behavior is realized when d>35 Å.

Considering FIG. 5 (a), one sees that in the vicinity of d~11 Å (shorter tubes) and d~34 Å (longer tubes) there is a decrease in 1/$T_1$. This is explained with the location of the tube-surface vdW potential minimum being very close to the stopping position of the moving tube. There the nanotube is attracted by the sample and it is slowed down as a result. Thus the tube spends extra time around that location before it is suddenly repelled by the repulsive vdW part resulting in a reversal of the motion. As the sample is brought closer to the edge of the stationary tube, the influence of the repulsive part from the vdW potential becomes more significant and a rather large increase in 1/T, and 1/$T_f$ is found. In fact, the period for the first cycle of oscillations for the shorter and longer tubes can be changed by more than 2 times by bringing the surface at the very edge of the stationary tube (d=0 Å).

Similar changes are found in FIG. 5 (b), showing 1/$T_f$ vs. d dependence. When the surface is in the close proximity of the surface (d<12 Å for the shorter and d<35 Å for the longer tubes), the oscillating tube loses some of its initial energy due to the friction. The loss continues until the tube is able to extrude at a distance $z_0(t)<z_c$, after which it becomes a friction-free double wall nanotube oscillator. The region of these oscillations is determined by the combined effect of the friction and the position of the surface-tube vdW potential. It is suggested that in this case 1/$T_f$ is defined as the frequency of oscillations. FIG. 5 (b) shows that for both, shorter and longer tubes, the frequency can be changed by more than 2 times by bringing the surface at the edge of the outer tube.

Another feature that can be seen from FIG. 5 (a) is that the role of the friction on the characteristic 1/$T_1$ time is relatively small. It is well know that friction does not affect very much the time for the first several periods of a mechanical underdamped oscillator while it can change significantly its amplitude, and this is what is shown in FIG. 3 and FIG. 5 (a). For the friction-free oscillations regime after the initial loss of energy, the tube is not affected by $\gamma$ any more. If $\gamma$ is small, the tube has not lost much energy and it oscillates in a relatively large distance region (determined also by the location of the vdW minimum). If $\gamma$ is large, the tube has lost more energy and it oscillates in a smaller distance region. The net effect is such that the oscillatory frequency is not affected by the friction.

As such, in accordance with the CNT oscillator of the present invention a practical device for profiling of surfaces is proposed. The operation of such a device is determined mainly by two factors: i) some CNT characteristic times show dramatic changes as a function of the tube-surface distance d and are not affected by friction; and ii) the main contribution from the sample to the oscillatory motion comes from a rather localized circular region ~5$R_1$. The goal is to be able to measure the characteristic times and relate them to the tube-surface distance.

Figure 6:
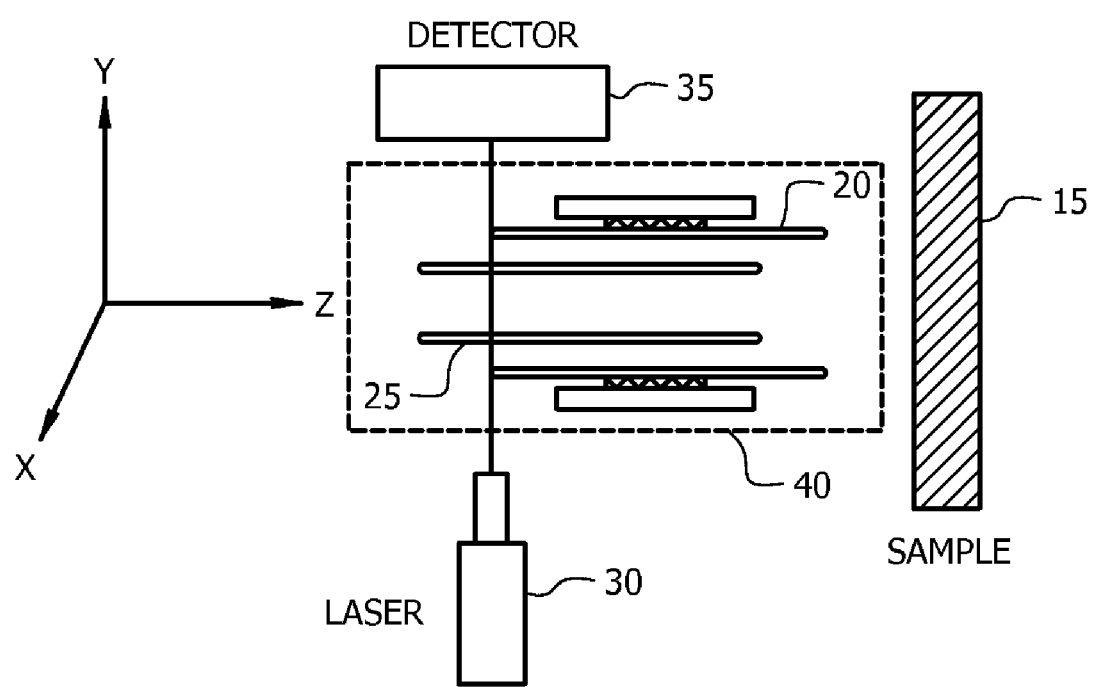
FIG. 6 is a schematic illustration of the proposed CNT oscillator device for profiling surfaces.

FIG. 6 is a schematic illustration of the proposed configuration to monitor the motion of the oscillating inner nanotube in order to profile a sample surface. FIG. 6 illustrates a laser-detector system, where the change in the beam intensity during the tube motion can be used for measurements to will enable the profiling of a sample surface. The laser beam 30 is aligned to be just before the edge of the stationary tube 20, distal from the sample 15. As the oscillatory inner tube 25 oscillates, the detector 35 measures the change in the laser beam intensity and records each time this happens, therefore determining the frequency of the oscillation.

Consider for example, the (5,0)@(7,9) double wall CNT with 2$L_1$=2$L_2$=150 Å and a sample of specific material characterized with atomic density $\sigma_s$, Hamaker constants A and B, and a friction coefficient $\gamma$. The double wall CNT 40 is brought in the vicinity of the sample 15 and the oscillatory motion is initiated by extruding the inner tube 25 from the outer tube 20 by some initial distance s. Then one can measure 1/$T_1$ using the laser 30 and detector 35 and relate it to a specific distance d using the model described above Similarly, 1/$T_f$ can be measured after the tube has reached the friction-free regime of oscillation and can also be related to d in accordance with the present invention. Since the oscillatory motion is determined mainly by the localized sample region $r_s$~1 nm in this case, the sample (or the tube) is moved along the xy-plane parallel to another position $r_s$. One measures 1/$T_1$ and/or 1/$T_f$ again and relates them to d. Thus repeating this process many times, allows one to map the shape of the studied surfaces.

Different double wall CNT with various lengths and chiralities can be used for such a device. Shorter tubes result in more dramatic changes in 1/T, but they have lesser extrusion capabilities thus surfaces with lesser roughness can be studied. Longer tubes result in less dramatic changes in 1/T, but they can be extruded more, and surfaces with larger roughness can be studied. In addition, for thicker tubes larger regions from the sample will determine the vdW interaction and the oscillatory motion. Thus for thinner tubes the step of surface mapping is smaller resulting in a better in-plane resolution.

The double wall CNT oscillator can be viewed as an alternative to an AFM tip for investigating surfaces. The main difficulties come from accurately measuring the first period of the oscillations and reinitiating the oscillatory motion. However, there can be some advantageous features. Since it operates in a non-contact mode, it can be a virtually a non-fatigued, non-wear system. Also, the interaction between the oscillating nanotube and a rather localized region from the surface (~1 nm for the (5,0)@(7,9) CNT) makes it equivalent to a very sharp AFM tip (a typical AFM tip has a 10-20 nm size), therefore it is possible to obtain a higher in-plane resolution as compared to the best AFM ones. Furthermore, the steep 1/T vs. distance dependence slope leads to the possibility of achieving a high perpendicular to the surface resolution as well and, consequently, to profile surfaces with relatively small roughness (less than 9 Å in a particular embodiment with the 2L=70 Å system). Finally, the double CNT oscillator can be used even if the nanotubes do not have a perfect structure. This is suggested by experimental studies showing that sliding nanotubes have the ability to absorb induced damages and defects by self-healing mechanisms and maintaining low dissipation processes.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween. Now that the invention has been described,

What is claimed is:

1. A method for profiling a sample surface, the method comprising:
    positioning an open-ended double wall carbon nanotube oscillator in close proximity to a sample surface such that the axis of the carbon nanotube oscillator is substantially perpendicular to a sample surface, the carbon nanotube oscillator comprising a stationary carbon nanotube having a first length and a first interior diameter and an oscillatory carbon nanotube positioned within the interior of the stationary carbon nanotube, the oscillatory carbon nanotube having a second length and a second interior diameter that is smaller than the first interior diameter;
    initiating the oscillation of the oscillatory carbon nanotube;
    measuring the frequency of oscillation of the oscillatory carbon nanotube; and
    re-positioning the carbon nanotube oscillator at a plurality of locations perpendicular to the sample surface, re-initiating the oscillation of the oscillatory carbon nanotube and re-measuring the frequency of oscillation at each of the plurality of locations to profile the sample surface.

2. The method of claim 1, wherein initiating the oscillation of the oscillatory carbon nanotube comprises:
    extruding the oscillatory carbon nanotube from the stationary carbon nanotube, along the common axis of the stationary and oscillator carbon nanotubes, to a first distance from a first edge of the stationary carbon nanotube; and
    releasing the oscillatory carbon nanotube to initiate the oscillation.

3. The method of claim 2, wherein extruding the oscillatory carbon nanotube comprises electrostatically telescoping the oscillatory carbon nanotube.

4. The method of claim 2, wherein extruding the oscillatory carbon nanotube further comprises extruding the oscillatory carbon nanotube to a first distance from the first edge of the stationary carbon nanotube wherein the first distance is less than 30% of the first length of the stationary carbon nanotube.

5. The method of claim 1, wherein measuring the frequency of the oscillation of the oscillatory carbon nanotube comprises:
    positioning a laser at a first edge, distal from the sample surface, of the stationary carbon nanotube, the laser to emit a laser beam; and
    positioning a laser detector at a first edge, distal from the sample surface, of the stationary carbon nanotube and in-line with the laser, the detector to measure the intensity of the laser beam emitted by the laser as the oscillatory tube oscillates.

6. The method of claim 1, wherein measuring the frequency of the oscillation of the oscillatory nanotube comprises measuring the frequency at a first period of the oscillations.

7. The method of claim 1, wherein measuring the frequency of the oscillation of the oscillatory nanotube comprises measuring the frequency at a friction-free period of the oscillations.

8. The method of claim 1, wherein re-positioning the carbon nanotube oscillator at a plurality of locations perpendicular to the sample surface comprises moving the sample surface along an xy-plane.

9. The method of claim 1, where re-positioning the carbon nanotube oscillator at a plurality of locations perpendicular to the sample surface comprises moving the carbon nanotube oscillator along an xy-plane.

10. A system for profiling a sample surface, the system comprising:
    an open-ended double wall carbon nanotube oscillator comprising a stationary carbon nanotube having a first length and a first interior diameter and an oscillatory carbon nanotube positioned within the interior of the stationary carbon nanotube, the oscillatory carbon nanotube having a second length and a second interior diameter that is smaller than the first interior diameter; and
    a laser-detector positioned at a first edge, distal from a sample surface, of the stationary carbon nanotube, the laser-detector for measuring the frequency of oscillation of the oscillatory carbon nanotube.

11. The system of claim 10, further comprises means for initiating the oscillation of the oscillatory carbon nanotube.

12. The system of claim 11, wherein the means for initiating the oscillation of the oscillatory carbon nanotube further comprises an electrostatic telescoping device to extrude the oscillatory carbon nanotube from the stationary carbon nanotube by an initial extrusion distance.

13. The system of the 12, wherein the initial extrusion distance is equal to less than about ⅓ of the first length of the stationary carbon nanotube.

14. The system of claim 10, wherein the carbon nanotube oscillator is a (5,0)@(7,9) double wall carbon nanotube and wherein the first length and the second length are equal to 150 Å.

15. The system of claim 10, wherein the laser-detector comprises:
- a laser to emit a laser beam; and
- a laser detector positioned in-line with the laser, the detector to measure the intensity of the laser beam emitted by the laser as the oscillatory tube oscillates.

16. The system of claim 10, wherein the first diameter is larger than the second diameter by approximately 6.8 angstroms.

17. The system of claim 10, wherein the stationary carbon nanotube and the oscillatory carbon nanotube are incommensurate.

18. The system of claim 10, wherein the ends of the carbon nanotube oscillator are saturated to prevent chemical reactions with the environment.

19. The system of claim 10, wherein the carbon nanotube oscillator is positionable in close proximity to, and substantially perpendicular to, the sample surface.

20. The system of claim 19, wherein the carbon nanotube oscillator is re-positionable along an xy-axis relative to the sample surface, and substantially perpendicular to, the sample surface.

* * * * *

UNITED STATES PATENT AND TRADEMARK OFFICE
CERTIFICATE OF CORRECTION

PATENT NO. : 8,060,943 B1  
APPLICATION NO. : 12/548070  
DATED : November 15, 2011  
INVENTOR(S) : Adrian Popescu et al.

It is certified that error appears in the above-identified patent and that said Letters Patent is hereby corrected as shown below:

In the Specifications

Col. 1, lines 15-17 should read:

STATEMENT OF GOVERNMENT INTEREST

This invention was made with government support under Grant #DE-FG02-06ER46297 awarded by the Department of Energy. The government has certain rights in the invention.

Signed and Sealed this
Eighth Day of October, 2013

Teresa Stanek Rea
*Deputy Director of the United States Patent and Trademark Office*